US008958367B2

(12) United States Patent
Jung et al.

(10) Patent No.: US 8,958,367 B2
(45) Date of Patent: Feb. 17, 2015

(54) METHOD AND APPARATUS FOR INITIAL ACCESS TO A NETWORK IN A FEMTO SYSTEM

(75) Inventors: Inuk Jung, Anyang-si (KR); Jin Lee, Anyang-si (KR); Yongho Kim, Anyang-si (KR); Kiseon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 138 days.

(21) Appl. No.: 13/703,001

(22) PCT Filed: Jun. 8, 2011

(86) PCT No.: PCT/KR2011/004214
§ 371 (c)(1),
(2), (4) Date: Dec. 7, 2012

(87) PCT Pub. No.: WO2011/155772
PCT Pub. Date: Dec. 15, 2011

(65) Prior Publication Data
US 2013/0089032 A1 Apr. 11, 2013

(30) Foreign Application Priority Data

Jun. 8, 2010 (KR) .................. 10-2010-0053785

(51) Int. Cl.
*H04W 4/00* (2009.01)
*H04M 1/66* (2006.01)
*H04W 48/12* (2009.01)
*H04W 48/16* (2009.01)
*H04W 36/04* (2009.01)
*H04W 84/04* (2009.01)

(52) U.S. Cl.
CPC .............. *H04W 48/12* (2013.01); *H04W 48/16* (2013.01); *H04W 36/04* (2013.01); *H04W 84/045* (2013.01)
USPC .......................................... 370/328; 455/411

(58) Field of Classification Search
None
See application file for complete search history.

(56) References Cited

U.S. PATENT DOCUMENTS

2011/0171949 A1* 7/2011 Liao et al. .................. 455/422.1

FOREIGN PATENT DOCUMENTS

| KR | 10-2009-0115030 | 11/2009 |
| KR | 10-2010-0048834 | 5/2010 |
| KR | 10-2010-0048880 | 5/2010 |

OTHER PUBLICATIONS

PCT International Application No. PCT/KR2011/004214, Written Opinion of the International Searching Authority dated Feb. 15, 2012, 17 pages.

* cited by examiner

*Primary Examiner* — Afshawn Towfighi
(74) *Attorney, Agent, or Firm* — Lee, Hong, Degerman, Kang & Waimey

(57) ABSTRACT

The present invention relates to a wireless access system to which a femto cell is applied. In addition, the present invention relates to an initial access method in a femto cell environment, a method for handover to a femto cell and apparatus for supporting the methods.

13 Claims, 15 Drawing Sheets

METHOD AND APPARATUS FOR INITIAL ACCESS TO A NETWORK IN A FEMTO SYSTEM

CROSS-REFERENCE TO RELATED APPLICATIONS

This application is the National Stage filing under 35 U.S.C. 371 of International Application No. PCT/KR2011/004214, filed on Jun. 8, 2011, which claims the benefit of earlier filing date and right of priority to Korean Patent Application No. 10-2010-0053785, filed on Jun. 8, 2010, the contents of all of which are hereby incorporated by reference herein in their entireties.

FIELD OF THE INVENTION

The present invention relates to a wireless access system to which a femtocell is applied, and more particularly to an initial access method in a femtocell environment, a method for performing handover to a femtocell, and an apparatus for supporting the initial access method and the handover method.

BACKGROUND ART

A femtocell will hereinafter be described in brief.

Femto is a prefix in the metric system, denoting a factor of $10^{-15}$ or 0.000000000000001. Hence a femtocell or FBS refers to an ultra-small indoor Access Point (AP) for low-power home use or office use. Although the term "femtocell" is sometimes interchangeably used with "picocell", the former is used in the sense of a more advanced cell. The femtocell is a small cellular base station (BS) connected to a broadband router and functions to connect $2^{nd}$ Generation (2G) and $3^{rd}$ Generation (3G) voice and data to a backbone network of a mobile communication service provider via the Digital Subscriber Line (DSL).

The above-mentioned femtocell has the following advantages.

Recently, a new research paper has proposed a method for the femtocell to expedite the spread of 3G technology and greatly increase indoor coverage. Up to 2011, it is expected that the number of femtocell users throughout the world will increase to about one hundred and two million, and the number of access points (APs) serving as BSs will also increase to about thirty-two million.

Femtocells can expand cell coverage and increase the quality of voice service. Mobile communication service providers are expecting that subscribers may be familiar with 3G by providing data service via femtocells. The femtocells are also called femto base stations (FBSs) or femto Base Transceiver Stations (femto BTSs).

In summary, a communication system using femtocells offers the following benefits 1) to 4): 1) Cell coverage improvement, 2) Infrastructure cost decrease, 3) New service offering, 4) Fixed Mobile Convergence (FMC) acceleration.

One or more femtocells may be grouped on a service basis or geological area basis. For example, a femtocell group that can access only a specific MS may be referred to as a Closed Subscriber Group (CSG). A femtocell BS (FBS) recognizes a CSG ID of the MS so that it allows access of only the MS subscribed to the CSG.

FIG. 1 shows an example of a femtocell arrangement structure for use in an overlay network.

Referring to FIG. 1, a backbone network of the femtocell BS is directly connected to an Internet Service Provider (ISP) network connected by wire, and a Femtocell GateWay (FGW) may be located at an access point between the backbone network and the ISP network. The FGW may be used as an access point for communication with a Macrocell (or Macro) Base Station (MBS).

The FGW may be directly connected to femtocell BSs, or may be located between a core network and an ISP network so as to be an integrated server for each ISP. In addition, the system may guarantee its communication with a macrocell (or macro) BS (MBS) through a Core Network Service GateWay (CNS GW) or an Access Service Network GateWay (ASN GW) irrespective of the location of the FGW. In the overlay network, the MBS may transmit/receive or store some or all information units for FBSs.

If femtocell BS configuration is completed, the MBS may recognize other information including FBS location information. Therefore, the MBS may directly communicate with the FBS through an air interface.

In this case, the macro BS including a Home Femto BS of an MS and a Closed Subscriber Group (CSG) femto BS may be referred to as an Overlay Macro BS.

FIG. 2 shows an example of a femtocell arrangement structure in a non-overlay network.

If many users are temporarily crowded at a boundary among MBSs in a non-overlay structure, FBSs may be installed at a boundary among macrocells. In this case, the MBS may not store all information of FBSs therein. At this time, the FGW may serve as an access point where the FGW can communicate with the MBS in the same manner as in the overlay structure.

DETAILED DESCRIPTION OF THE INVENTION

Technical Problem

For initial access to a network, a user equipment (UE) or mobile station (MS) can determine a base station (BS) to be accessed to the UE or MS by scanning or searching for a downlink (DL) channel of the BS located in the vicinity of the UE or MS in an initialization state.

In the IEEE 802.16e or IEEE 802.16m system, a UE or MS can access a network of a macro BS using a sufficiently small amount of overhead and time. That is, a small number of the detected macro BSs and most macro BSs are designed to have the same type, so that network searching can be easily achieved. However, the initial network access scheme of the MS may be changed according to additional BS types such as a relay BS or femto BS newly introduced to IEEE 802.16m system.

In the case of the relay BS, information which one of BS entities will receive a control signal from the UE or MS may be changed according to a transparent or non-transparent type of the relay BS. In addition, a procedure for scanning or ranging the relay BS may also be changed in a different way from the macro BS.

In this case, the transparent relay BS is configured to transmit/receive only user plane information to/from the MS or UE, and is also configured to transmit/receive control signals to/from the MS (UE) and the macro BS. As a result, a centralized macro BS based network can be achieved. Differently from the transparent relay BS, the non-transparent relay BS directly transmits/receives user information and control signals to/from the relay BS and the MS in such a manner that a centralized network or a distributed network can be achieved.

The femto BS may be contained in the macro BS coverage (See FIG. 1), or may be installed either indoors or in a shaded region not covered with an indoor or macro BS (See FIG. 2).

Differently from the relay BS, the femto BS includes a distributed network configuration. Therefore, the number of femto BSs to be installed either indoors or in the center of town may be higher than the number of relay BSs.

Accordingly, a list of femto BSs contained in the macro BS is composed of a large amount of information, so that the list of femto BSs is not contained in a list of neighbor BSs including peripheral relay BS- or macro BS-information of the 802.16m system.

When the MS searches for a DL channel in an initial state (or initialization state), or when a large number of femto BSs is located in the vicinity of the MS, it is difficult for the legacy network initial access scheme to be applied to femtocells, because the searched femto BS may be either a femto BS capable of being accessed or another femto BS incapable of being accessed.

During the initial network access, there is a large number of detected femto BSs and it is impossible to recognize information as to whether the MS can access the corresponding femto cell, so that a delay time for network access is unavoidably increased.

In addition, it should be determined whether the macro BS or the femto BSs will be first scanned in such a manner that an initial network access to each femto BS can be effectively achieved.

Accordingly, the present invention is directed to a method and apparatus for performing initial network access to a femto cell in a femtocell environment that substantially obviates one or more problems due to limitations and disadvantages of the related art. An object of the present invention is to provide a method and apparatus for performing initial network access to a femtocell in a femtocell environment.

Another object of the present invention is to provide a method for supporting efficient scanning operations by assigning priority to the UE scanning order according to BS types.

Another object of the present invention is to provide a method for quickly and efficiently scanning and ranging a femto BS and a macro BS when a UE or MS performs initial access to a network in a femto BS environment.

Another object of the present invention is to provide an initial network access method and a method for performing handover to a femto cell when a macro BS and a femto BS coexist in the femto cell environment.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In order to solve the above-mentioned technical objects, the present invention proposes a wireless access system based on a femtocell. In addition, the present invention also proposes a method and apparatus for performing initial access in a femtocell environment, and a method and apparatus for performing handover to a femtocell.

In accordance with a first embodiment of the present invention, the object of the present invention can be achieved by providing a method for performing initial access to a network in a femtocell environment, the method including: detecting a femto base station (BS) by scanning a downlink (DL) channel; receiving a preamble from the femto BS, wherein the preamble includes not only a femto BS indicator indicating whether a corresponding BS is a femto BS but also a cell identifier (ID); receiving a superframe header (SFH) including a network initial access capability (NIAC) field and an offset field from the femto BS, wherein the NIAC field indicates whether it is possible to access a network and the offset field indicates a specific time at which network access information required for performing initial access to the network is transmitted; and obtaining the network access information at a specific time indicated by the offset.

In accordance with the first embodiment, the preamble may include a primary preamble (PA-preamble) and a secondary preamble (SA-preamble). The femto BS indicator may be contained in the primary preamble (PA-preamble) and the cell ID may be contained in the secondary preamble (SA-preamble). The superframe header (SFH) may further include a femto BS ID and a femto type field indicating whether the femto BS is an open femto BS or a closed femto BS.

In accordance with the first embodiment, if only the macro BS other than the femto BS is detected in the detecting of the femto BS, a mobile station (MS) may attempt to perform initial network access to a macro BS and may obtain the network access information of the femto BS.

In another aspect of a second embodiment of the present invention, a method for performing initial access to a network in a femtocell environment includes transmitting a preamble to a mobile station (MS), wherein the preamble includes not only a femto base station (BS) indicator indicating whether a corresponding BS is a femto BS but also a cell identifier (ID); transmitting a superframe header (SFH) including a network initial access capability (NIAC) field and an offset field to the mobile station (MS), wherein the NIAC field indicates whether it is possible to access the network and the offset field indicates a specific time at which network access information required for performing initial access to the network is transmitted; and transmitting the network access information to the mobile station (MS) at a specific time denoted by the offset.

In accordance with the second embodiment, the preamble may include a primary preamble (PA-preamble) and a secondary preamble (SA-preamble). The femto BS indicator may be contained in the primary preamble (PA-preamble) and the cell ID may be contained in the secondary preamble (SA-preamble).

In accordance with the second embodiment, the superframe header (SFH) may further include a femto BS ID and a femto type field indicating whether the femto BS may be an open femto BS or a closed femto BS.

In another aspect of a third embodiment of the present invention, a mobile station (MS) for performing initial access to a network in a femtocell environment includes: a transmission (Tx) module for transmitting radio data; a reception (Rx) module for receiving radio data; and a processor for controlling initial access to the network by controlling the transmission (Tx) module and the reception (Rx) module.

The processor detects a femto base station (BS) by scanning a downlink (DL) channel, receives a preamble from the femto BS, wherein the preamble includes not only a femto BS indicator indicating whether a corresponding BS is a femto BS but also a cell identifier (ID), receives a superframe header (SFH) including a network initial access capability (NIAC) field and an offset field from the femto BS, wherein the NIAC field indicates whether it is possible to access a network and the offset field indicates a specific time at which network access information required for performing initial access to the network is transmitted, and obtains the network access information at a specific time indicated by the offset.

In accordance with the third embodiment, the preamble may include a primary preamble (PA-preamble) and a secondary preamble (SA-preamble). The femto BS indicator may be contained in the primary preamble (PA-preamble) and the cell ID may be contained in the secondary preamble (SA-preamble).

In accordance with the third embodiment, if only the macro BS other than the femto BS is detected in the detecting of the femto BS, a mobile station (MS) may attempt to perform initial network access to a macro BS and may obtain the network access information of the femto BS.

The aforementioned first to third embodiments are only a part of the embodiments of the present invention, and various modifications to which technical features of the present invention are applied could be understood by the person with ordinary skill in the art to which the present invention pertains, based on the following detailed description of the present invention.

Effects of the Invention

As is apparent from the above description, exemplary embodiments of the present invention have the following effects.

First, the embodiments can efficiently perform initial network access to a femtocell in a femtocell environment.

Second, the embodiments are configured to assign priority to the UE scanning order according to BS types so as to efficiently support the scanning operation. That is, the embodiments can perform the scanning operation so as to perform the optimum network access procedure on the basis of specific information as to whether the macro BS or the femto BS is to be used as an initial network access target.

Third, the embodiments can provide a ranging method for enabling the MS to quickly and effectively access a femto or macro BS when the MS performs initial network access in a femto BS environment.

Fourth, the MS can efficiently access the network even though the macro BS and the femto BS coexist in the femtocell environment.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

Figure 1:
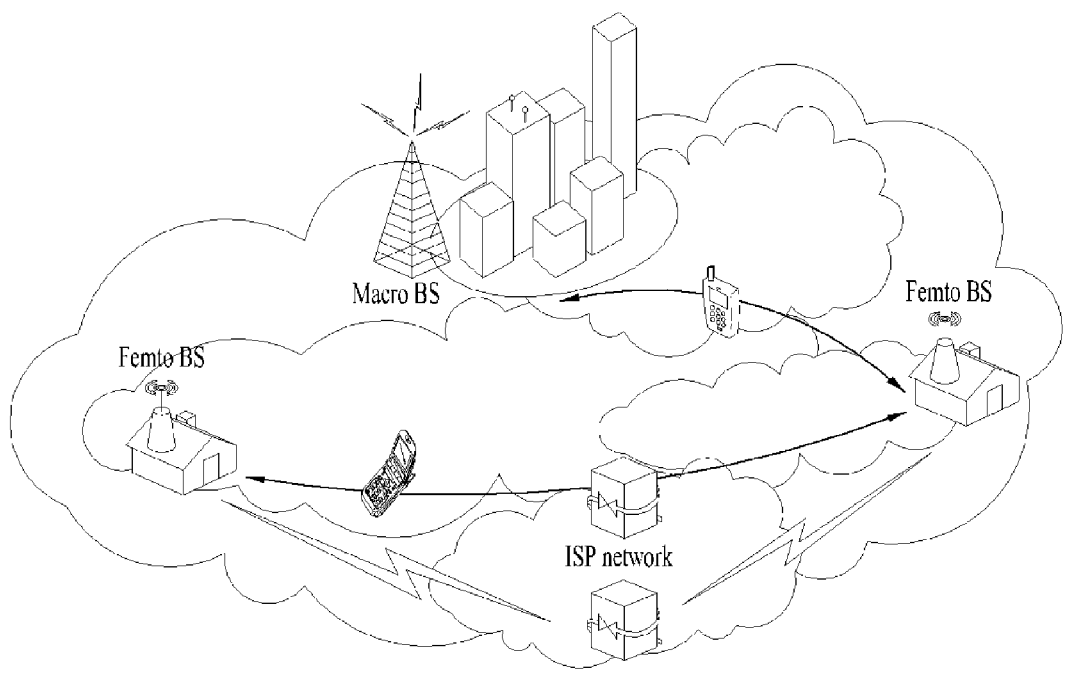
FIG. 1 shows an example of a femtocell arrangement structure for use in an overlay network.

The present invention relates to a wireless access system to which a femtocell is applied. In addition, the embodiments of the present invention disclose a method and apparatus for performing initial access in a femtocell environment, and a method and apparatus for performing handover to a femtocell.

Exemplary embodiments described hereinbelow are combinations of elements and features of the present invention. The elements or features may be considered optional unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment.

In the description of drawings, procedures or steps, which may distract from the substance of the present invention, are not explained. Additionally, procedures or steps, which can be understood by those skilled in the art, are not explained as well.

In exemplary embodiments of the present invention, a description is made of a data transmission and reception relationship between a BS and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'Advanced Base Station (ABS), etc.

The term 'MS' may be replaced with the term 'User Equipment (UE)', 'Subscriber Station (SS)', 'Mobile Subscriber Station (MSS)', 'mobile terminal', 'Advanced Mobile Station (', etc.

A transmitter means a fixed and/or mobile node that transmits voice or data service and a receiver means a fixed and/or mobile node that receives voice or data service. Hence, an MS may be a transmitter and a BS may be a receiver, on an uplink. Likewise, the MS may be a receiver and the BS may be a transmitter, on a downlink.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents.

All terminology used herein may be supported by at least one of P802.16e-2004, P802.16e-2005, P802.16Rev2 and P802.16m documents which are the standards of IEEE 802.16.

The detailed description, which will be given below with reference to the accompanying drawings, is intended to explain exemplary embodiments of the present invention, rather than to show the only embodiments that can be implemented according to the present invention.

Specific terms used for the exemplary embodiments of the present invention are provided to help the understanding of the present invention. These specific terms may be replaced with other terms within the scope and spirit of the present invention.

The IEEE 802.16e system according to the embodiments of the present invention may be referred to as a legacy or 16e system. In addition, the IEEE 802.16m system is evolved from the 16e system, and may be referred to as an evolved or 16m system.

The term "femtocell" means a region covered by a femto BS. In accordance with the embodiments of the present invention, the femtocell is conceptually identical to the femto BS. Likewise, the term "macrocell" means a region covered by the macro BS, and the macrocell is conceptually identical to the macro BS.

Initial Network Access Method for Use in IEEE 802.16e System

Figure 3:
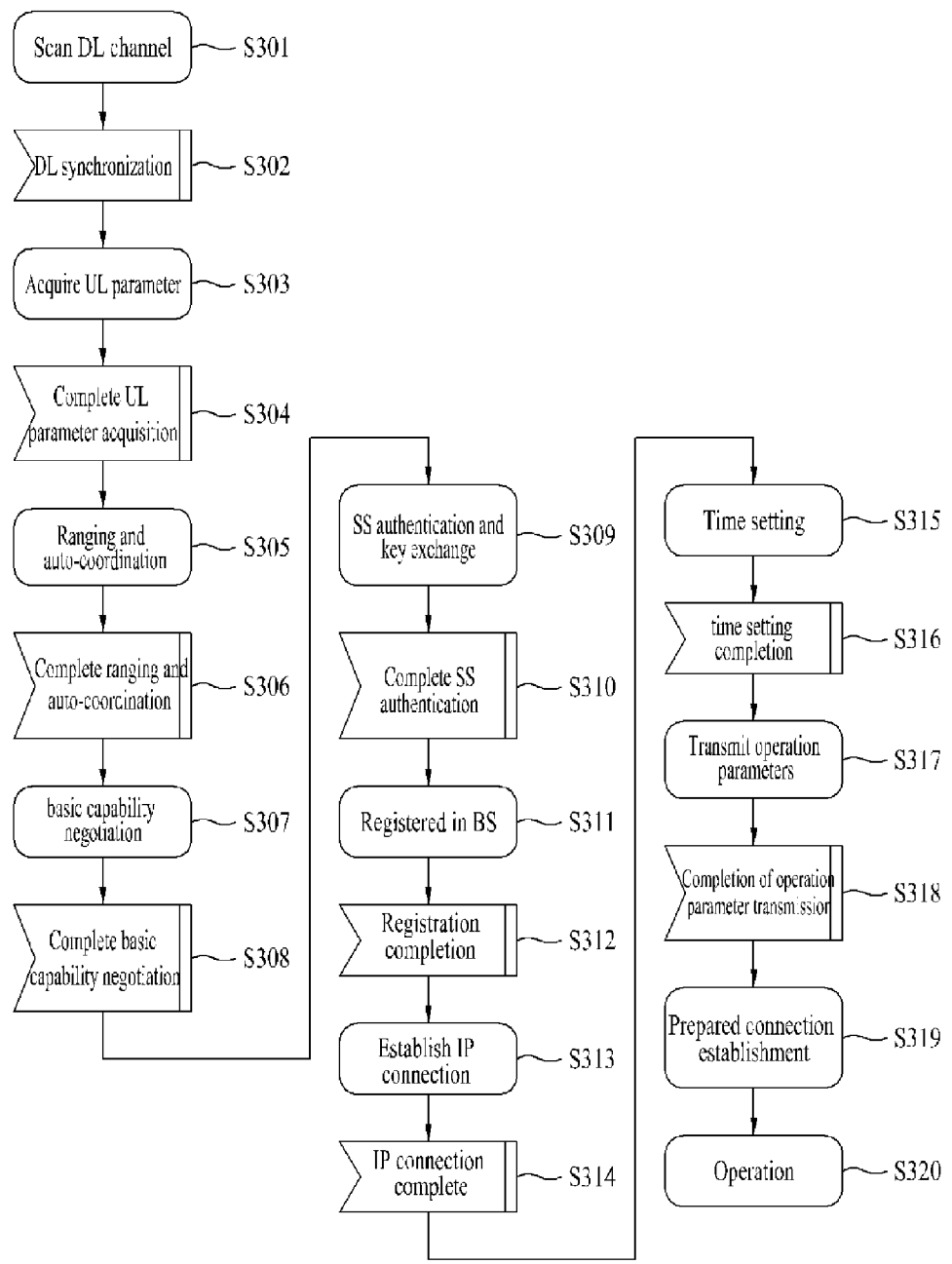
FIG. 3 is a flowchart illustrating an initial network access procedure for use in the 16e system.

FIG. 3 is a flowchart illustrating an initial network access procedure for use in the 16e system.

In a general broadband wireless network, since the MS does not have initial network geographical or configuration information, all DL channels (or frequencies) of the macro BS need to be scanned in step S301. However, assuming that there is a small number of macro BSs (about 4 or 5 macro BSs) located in the vicinity of the MS, load for the scanning procedure is not much in amount.

Therefore, the MS first scans a DL channel of a BS so that it can search for a BS accessible by the MS in step S301.

The MS establishes DL synchronization with the searched BS in step S302. The MS acquires UL system information in steps S303 and S304. In addition, after completion of system configuration, the MS selects an arbitrary CDMA ranging code so that it can perform ranging with the searched BS in step S305.

The MS performs ranging with the BS using the contention-based method, so that it can establish UL synchronization with the BS. The BS transmits an RNG-RSP message to the BS, so that it can inform the MS of a plurality of values to be amended by the MS until reaching complete synchronization. In this case, the RNG-RSP status may be established as a continued state. The MS continuously performs the ranging procedure until receiving a success-status RNG-RSP message from the BS in step S306.

After the MS establishes synchronization with the BS, the MS performs basic capability negotiation with the BS in steps S307 and S308, and performs MS authentication and key exchange in steps S309 and S310. Upon completion of MS authentication, the MS is registered in the BS in steps S311 and S312.

The MS establishes IP connection in the BS in steps S313 and S314, establishes registration dates in steps S315 and S316, and transmits operation parameters to the BS in steps S317 and S318. In addition, the MS may establish provided connection and then receive necessary services in steps S319 and S320.

Figure 4:
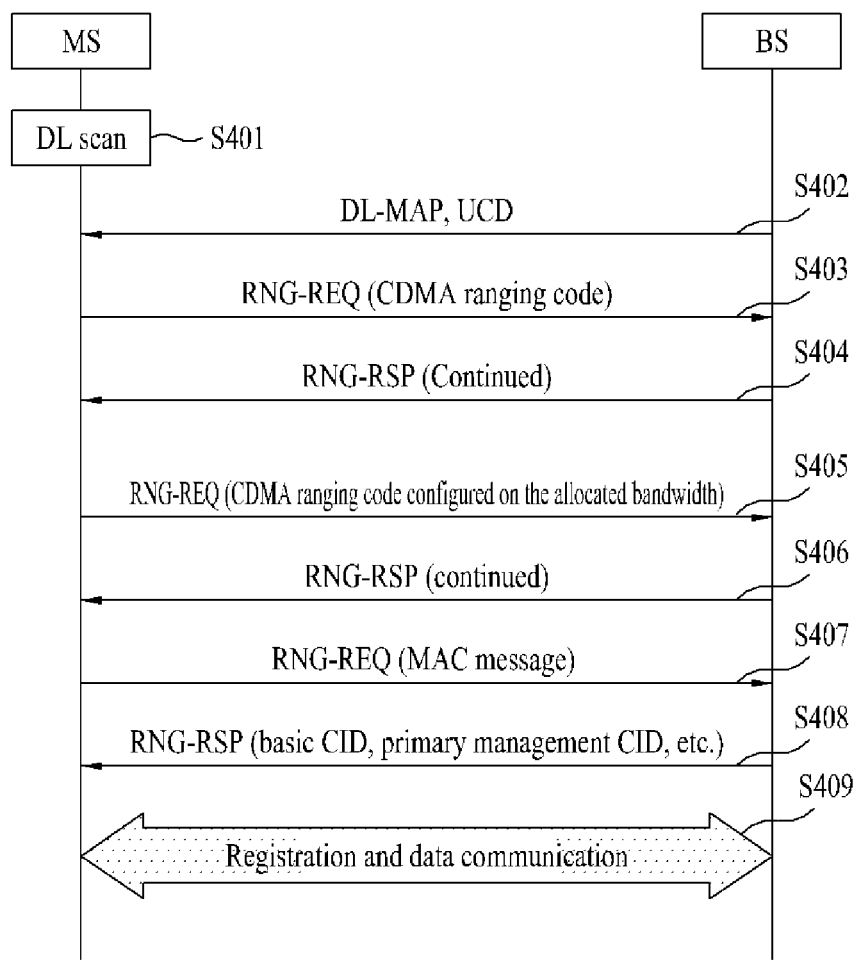
FIG. 4 is a flowchart illustrating a ranging procedure between an MS and a macro BS for use in the 16e system.

FIG. 4 is a flowchart illustrating a ranging procedure between an MS and a macro BS for use in the 16e system.

Referring to FIG. 4, the MS scans DL channels of the macro BS in step S401.

The MS receives a DL map (DL_MAP) and/or DCD/UCD of the BS through the searched DL channel, so that it can acquire physical information of the corresponding BS in step S402.

The MS transmits a ranging request (RNG-REQ) message including a CDMA ranging request to the BS so that it can access the BS in step S403.

If the BS receives the CDMA ranging code, a ranging response (RNG-RSP) message including a ranging slot and a ranging code is transmitted to the MS. In this case, the status of the RNG-RSP message is a continued status. In addition, the RNG-RSP message includes all the necessary adjustment values in step S404.

The UE transmits the ranging code to a periodic ranging region such that it can continuously perform the ranging process in the same manner as in the first access. That is, the MS can transmit the initial ranging code to the BS so as to request bandwidth allocation in step S405.

If the BS receives the initial ranging code, the BS transmits the RNG-RSP message including a success status to the MS. In this case, the BS can perform bandwidth allocation in such a manner that the MS transmits the RNG-REQ message to the BS in step S406.

The MS transmits the RNG-REQ message to the BS at a CDMA allocation IE in step S407.

The BS transmits the RNG-RSP message to the BS so that the initial ranging procedure is completed in step S408. The RNG-RSP message includes a basic CID, a primary CID, and a management CID.

Thereafter, the MS information is registered in the BS so that data communication between the MS and the BS can be achieved in step S409.

Femto Network Access Method for Use in 3GPP2 System

Two femto network access methods have been proposed by a 3GPP2 group.

A first method of the two femto network access methods is an 'elect first and reject later' scheme, and a second method is a 'select right' scheme.

In accordance with the first method, the MS primarily attempts to range an initial femto BS detected by MS scanning. Thereafter, the femto BS confirms whether to provide a service to the MS attempting to perform ranging, or confirms whether the MS is normally authenticated. If the MS attempting to perform ranging is not authenticated, the femto BS denies or rejects the MS. The rejected MS again scans the femto BS so that it attempts to connect to another network.

In accordance with the second method, the MS can be authenticated by the femto BS detected through a predetermined method, and a femto BS capable of providing a necessary service is found by the MS in such a manner that the MS can access the corresponding network.

Initial Network Access Method for Use in IEEE 802.16m System

Figure 5:
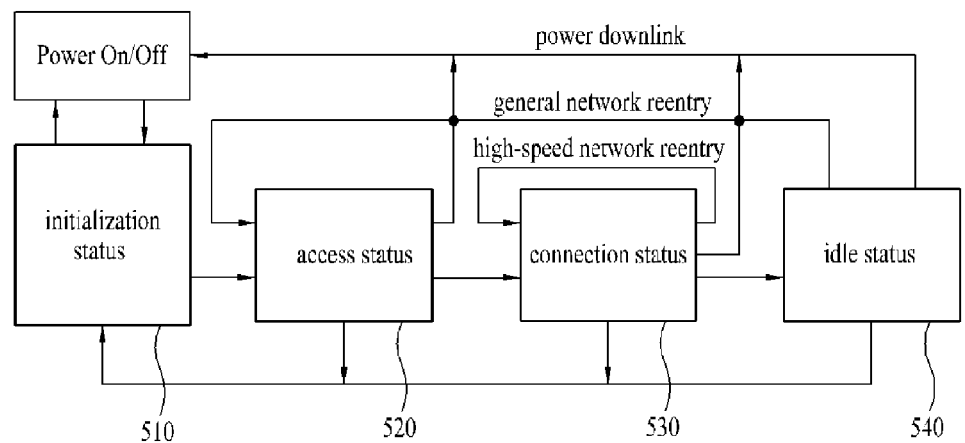
FIG. 5 is a conceptual diagram illustrating MS states for use in the 16m system.

FIG. 5 is a conceptual diagram illustrating MS states for use in the 16m system.

MS states can be classified into a total of four states. For example, the MS states can be classified into an initialization state 510, an access state 520, a connected state 530, and an idle state 540.

The initialization state 510 and the access state 520 are associated with the initial network access. Referring to FIG. 5, if the MS is powered on, the MS enters the initialization status. In the initialization status, the MS searches for the BS by scanning a DL channel, and obtains system information of the searched BSs, such that it can select a BS to be finally accessed by the MS.

In the MS access status, the MS can perform the ranging procedure with a BS to be connected to the network as shown in FIG. 4. Namely, the MS performs authentication and network registration procedures with the BS, so that it can switch to the access status.

In the access state, the MS performs general data and/or voice communication operations with the BS. If a predetermined condition is satisfied, the MS enters an idle mode so that MS power consumption can be minimized.

Figure 6:
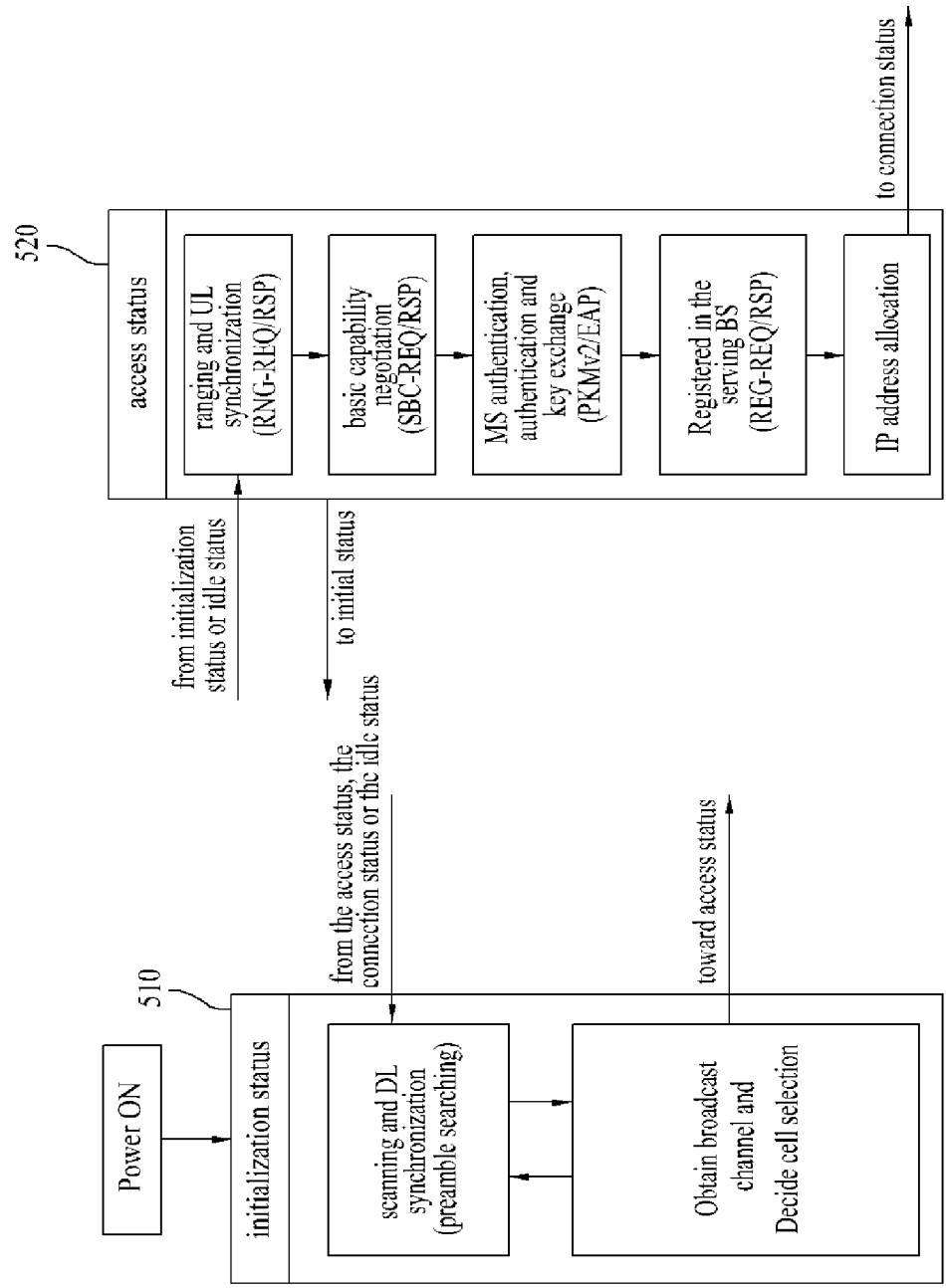
FIG. 6 is a conceptual diagram illustrating an MS initial state and an MS connection state for use in the 16m system.

FIG. 6 is a conceptual diagram illustrating an MS initial state and an MS connection state for use in the 16m system.

Referring to FIG. 6, if the MS is powered on, the MS enters an initialization status. The MS initialization status may also start from the access status, the connected status, or the idle status as necessary. In the initialization status, the MS scans a DL channel of a neighbor BS and can establish DL synchronization with a target BS. In addition, the MS can select a cell through the obtained broadcast channel. The MS having selected a cell is transitioned to the connected status.

In order to allow the MS to acquire UL synchronization with the BS in the access status, the MS performs the ranging procedure for exchanging the RNG-REQ message with the RNG-RSP message. After completion of the ranging procedure, the MS exchanges SBC-REQ/RSP messages with the BS, so that it can perform the basic capability negotiation procedure. The MS performs an EAP-based authentication procedure with the BS, and can exchange security materials with the BS through key negotiation. The MS transmits a registration request (REG-REQ) message to the BS and receives a registration response (REG-RSP) message from the BS in such a manner that the MS can be registered in the serving BS. The MS may allocate IP addresses and be shifted to the connected status.

In order to more rapidly perform the network initial access procedure in the 16m system than in the legacy network (e.g., 16e system), system information such as UCD/DCD can be transmitted in units of a superframe (20 ms) or subframe (0.617 ms).

However, the initial network access signaling procedure is basically similar to that of FIG. 4. For example, since the powered MS does not recognize network information, it searches for the accessible BS by scanning DL channels of the macro BSs. The MS obtains system information of the searched BS, and performs ranging with the BS through a CDMA code.

Initial Network Access Method Through the Femto BS

Methods for performing initial access to a radio network through the femto BS in the 16m system according to an embodiment of the present invention will hereinafter be described in detail. Parts not described in the following initial network access methods and the same or similar terms as those of FIGS. 3 to 6 will refer to FIGS. 3 to 6.

Figure 7:
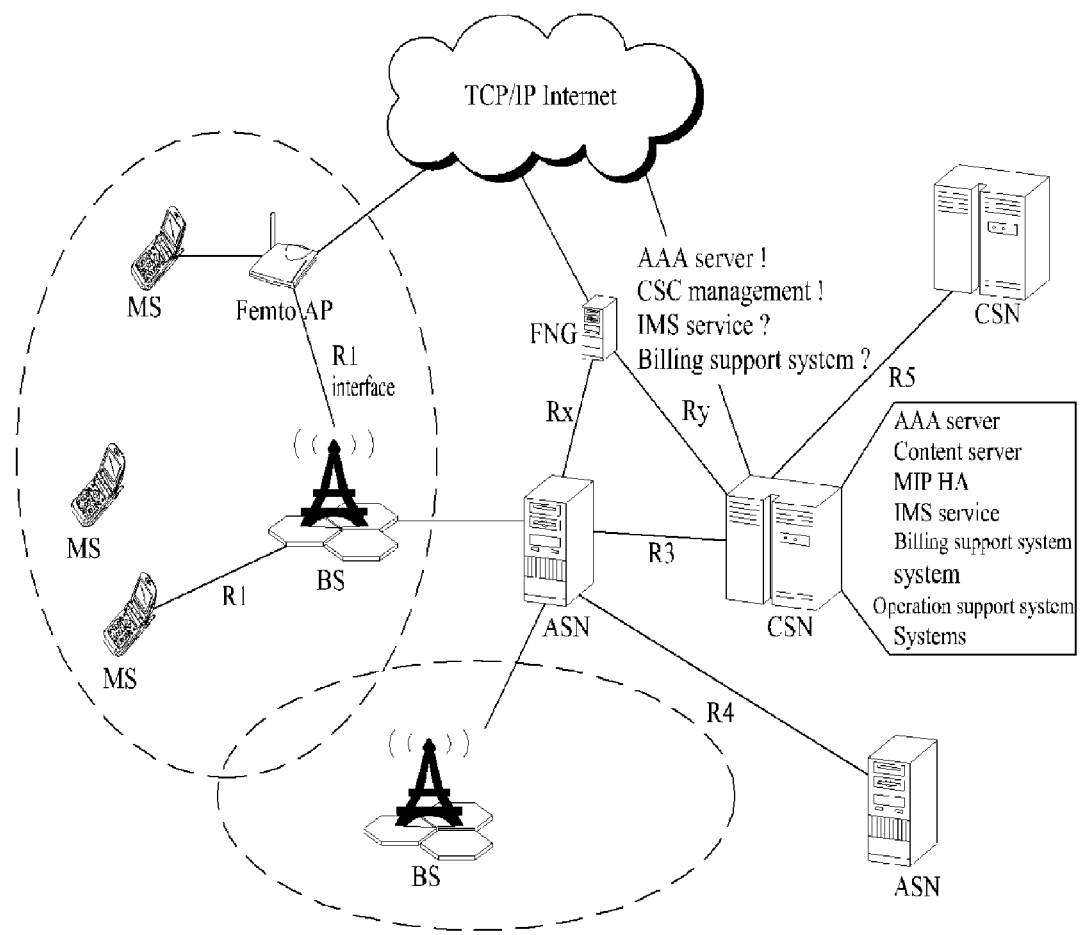
FIG. 7 is a schematic diagram illustrating a network structure indicating the femto BS environment applicable to the embodiments of the present invention.

FIG. 7 is a schematic diagram illustrating a network structure indicating the femto BS environment applicable to the embodiments of the present invention.

In the embodiments of the present invention, the femto BS is newly added to the legacy network, so that some items added to the entire network structure exist. In accordance with the embodiments of the present invention, the femto BS may perform a necessary function by directly connecting to the Internet.

As can be seen from FIG. 7, a Femto Network Gateway (FNG) entity is added to the network structure of 16e system so as to support the femto BS environment. Referring to FIG. 7, FNG can support an Authentication Authorization Accounting (AAA) server function, a Closed Service Group (CSG) management function, and an IP Multimedia Subsystem (IMS) service provision and accounting support service. FNG is connected to the access service network (ASN) through Rx interface, and may be connected through a Connectivity Service Network (CSN) through Ry interface.

That is, the femto BS is directly connected to the TCP/IP Internet network through the FNG, so that it can receive necessary services from the CSN. The MS connected to the femto BS can receive authentication and IMS functions from FNG or CSN. The femto BS is connected to the macro BS through R1 interface, so that the femto BS can receive a DL channel from the BS. In addition, the femto BS can transmit a control signal for MS management using a UL channel through the R1 interface.

In the embodiments of the present invention, the femto BS serves as a conceptual element of a new network in the 16m system, so that it can be operated on the basis of the following assumptions and definitions.

1) MS can discriminate among the macro BS, the relay BS, and the femto BSs using a superframe header (SFH), a preamble (e.g., primary advanced preamble), and/or a secondary advanced preamble).

2) The femto BS can receive a DL channel of the macro BS.

3) The macro BS can obtain information of all femto BSs located in the macro BS coverage through an entity (e.g., FNG) for managing femto BSs.

4) The 16m system supports a Network Access Point (NAP) shared network structure.

5) One femto BS can be managed through a plurality of network service providers (NSPs).

6) The macro BS does not periodically broadcast information of neighbor femto BSs. That is, if the MS BS receives a request from the MS and/or the femto BS, information of neighbor femto BSs can be transmitted to the MS and/or the femto BS.

Figure 2:
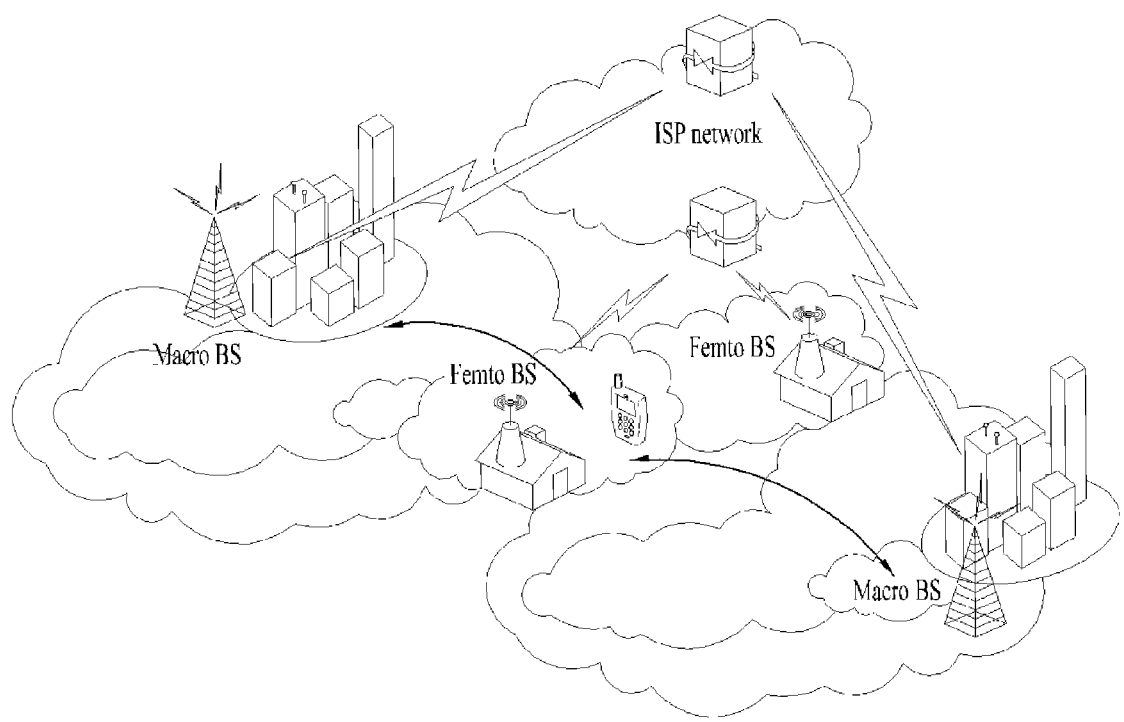
FIG. 2 shows an example of a femtocell arrangement structure in a non-overlay network.

7) The femto BS can be identified according to overlay and non-overlay networks (See FIGS. 1 and 2).

If the femto BS is contained in the overlay network, the macro BS can provide location information of several femto BSs to a plurality of MSs. In addition, the femto BS can receive a request from the macro BS or another upper entity through a backbone network. The femto BS is synchronized to the macro BS, and it is assumed that the femto BS can receive a DL channel from the macro BS.

Assuming that the femto BS is contained in the non-overlay network, since the femto BS does not include a macro BS to which the femto BS belongs, the femto BS can utilize its own preamble set or STID. Alternatively, the femto BS can receive a preamble or STID resources from the nearest macro BS according to the centralized scheme. Alternatively, the femto BS obtains system information (e.g., preamble, STID) from the nearest macro BS through the backbone network according to the centralized scheme. That is, operations of the non-overlay network are similar to those of the overlay network.

8) The MS can recognize not only a Bearer Connection Capability (BCC) field indicating the access authority of the femto BS but also a Network Information Access Capability (NIAC) field indicating provision or non-provision of network configuration information through the SFH of the corresponding femto BS.

BCC and NIAC may also be indicated through a BSID or a cell ID. That is, a specific bit position of either the BSID or the cell ID may indicate a BCC or NIAC. Alternatively, the BSID of the femto BS is longer than the macro BS by 2 bits, so that BCC or NIAC can be indicated.

BCC can indicate whether the MS can access the open femto BS (open FBS) and/or the closed FBS.

The closed FBS groups a plurality of MSs capable of approaching the closed FBS, and assigns a Closed Subscriber Group (CSG) ID to the grouped MSs, so that accessing the femto BS from some MSs not participated in the service is limited.

The open femto BS is designed to accommodate any of MSs therein, and provides a necessary service to the accommodated MSs. BCC may be located at a primary SFH of the SFH, and is classified into information elements (IEs) transmitted to each superframe from among secondary SFH IEs in such a manner that the BCC is transmitted to each superframe. As a result, the MS not supporting a CSG is prevented from receiving a plurality of SFHs so as to obtain a BCC.

NIAC indicates whether the MS can perform initial access to the femto BS. Initial access means a procedure for obtaining network information before the MS is registered in the network. NIAC means whether the MS can obtain the corresponding message or network information from the SFH. The above-mentioned assumptions and definitions can be used and applied to all embodiments of the present invention.

Figure 8:
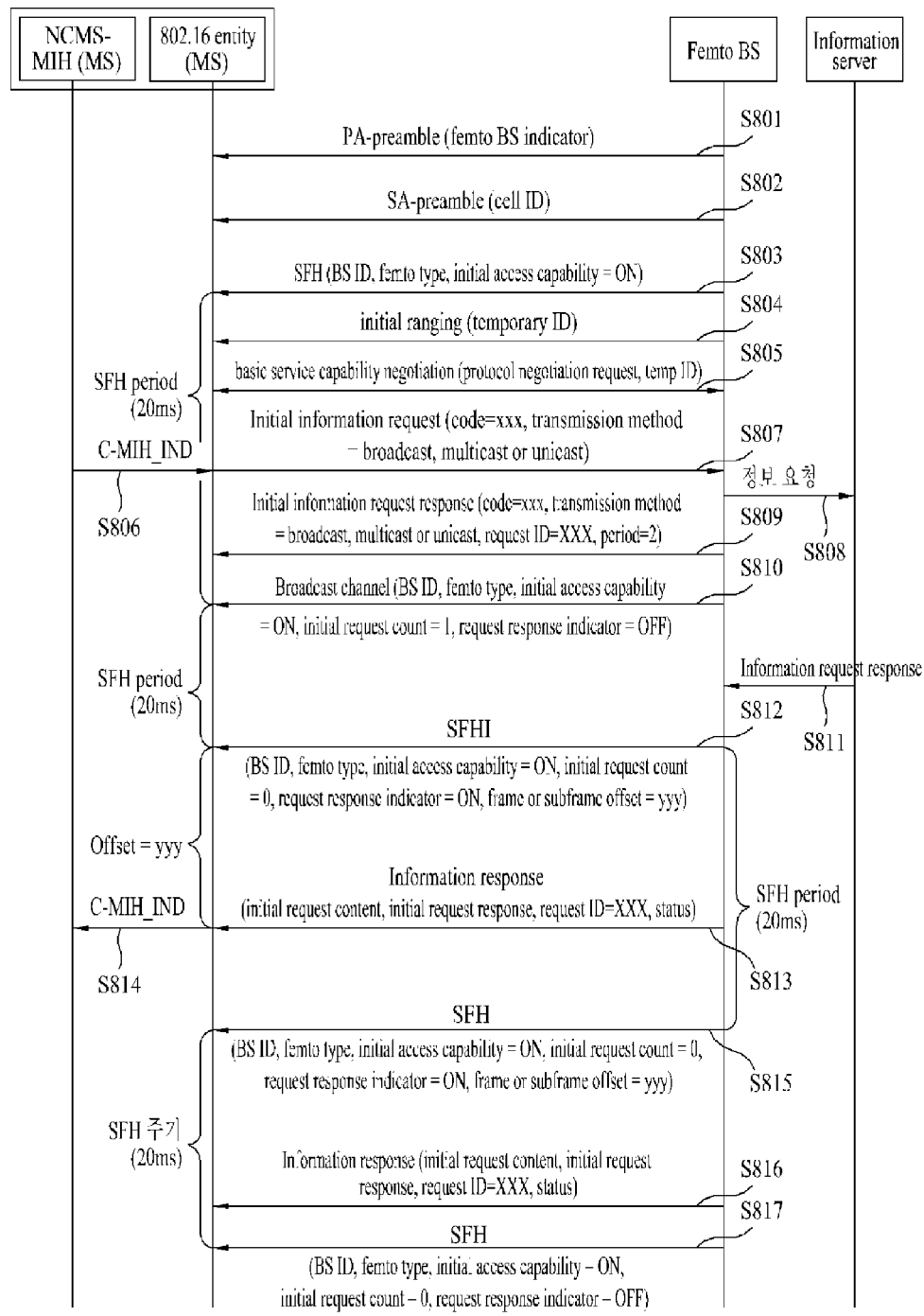
FIG. 8 is a flowchart illustrating a method for acquiring NIAC transmission information and NIAC-based network access information according to an embodiment of the present invention.

FIG. 8 is a flowchart illustrating a method for acquiring NIAC transmission information and NIAC-based network access information according to an embodiment of the present invention.

As can be seen from FIG. 8, a Media Independent Handover (MIH) defined in the IEEE 802.21 system can be used as a protocol for obtaining information associated with network access. Of course, the embodiment of FIG. 8 can also be implemented using other protocols providing the same functions.

The MS includes a physical (PHY) layer and Medium Access Control (MAC) layer through which the MS can communicate with the 16e and/or 16m radio interface. In addition, the PHY and MAC layers of the MS are configured to interwork with a Network Control Management System (NCMS) through the interface for managing/controlling the PHY and MAC layers. The NCMS is an aggregate of entities for control/management, and an MIH of NCMS is an entity used for the embodiment. NCMS may be an upper entity contained in the MS, and may be an external upper entity for supporting the MS located at a remote site.

The MS receives an indication message indicating that a current BS is a femto BS through a femto BS indicator contained in a primary preamble (PA-preamble) in step S801.

The MS obtains a cell ID through a secondary preamble (SA-preamble) to be transmitted after the PA-preamble in step S802.

The MS can receive additional information for the network through the SFH. The additional information for the network may include a Base Station Identification (BSID), a femto BS type field (indicating a Closed Femto or Open Femto), and a network initial access capability (NIAC) field. In this case, assuming that NIAC is turned on, this means that network access information can be obtained through additional query/response messages in step S803.

The MS performs initial ranging with the femto BS in step S804.

In the embodiment of the present invention, the initial ranging with the femtocell can be omitted because the distance between the femto BS and the UE is very short. During the initial ranging process, the BS performs allocation of a temporary ID (Temp ID) to be used by the MS, and can perform the initial ranging using the temporary ID (Temp ID).

The MS having performed the initial ranging negotiates the basic function with the BS. The MS negotiates a protocol to be used for acquiring network access associated information through the basic function negotiation procedure in step S805.

If the initial ranging of the step S804 is omitted, the MS can receive a temporary ID from the femto BS during the basic function negotiation process. The Temp ID may be used for message encryption before authentication with the femto BS. That is, a MAC address of the MS is transmitted through the authentication process with the femto BS, and the temp ID may be used for message transmission before receiving a control ID and/or a control ID/management ID.

NCMS MIH entity can transmit an information request message (e.g., C_MIH-IND) for requesting additional network information denoted by the network information access capability (NIAC) to the MAC layer of the MS in step S806.

The MAC layer of the MS contains a request message received from the NCMS in the MAC container of an initial information request message, and transmits the request message to the femto BS in step S807.

The initial information request message of the step S807 may include a request regarding a method for transmitting an initial information response message. That is, the initial information response message can be transmitted using one of a broadcast type, a multicast type, and a unicast type.

The femto BS transmits the information request message to an information server (IS) in step S808.

If information requested by the MS can be directly provided from the femto BS, the requested information is contained in the initial information response message and then transmitted to the MS. Otherwise, a period during which a message including the corresponding information is to be transmitted can be transferred to the MS in step S809.

The above period is a superframe offset via which the initial information response message can be transmitted. In the embodiment of FIG. 8, it is assumed that the period is set to 2. That is, a specific time at which the response message is transmitted includes the next superframe, so that MS-requested information is contained in a second superframe transmission period and then transmitted. In addition, since the MS can request a plurality of information pieces, the femto BS may include a query ID for identifying each MS request in the initial information response message of the step S809, so that the resultant initial information response message can be transmitted.

The femto BS transmits an SFH at an SFH transmission period. MS-requested information may be contained in the SFH. In addition, the SFH may include a femto BS ID (BS ID), a femto type parameter indicating the femto BS type, an initial query count and a query response indicator in step S810. In more detail, the initial query count indicates a superframe offset at which the initial information response message is to be transmitted when the initial information response message is not transmitted, and the query response indicator indicates whether MS-requested information is contained in a current superframe.

In the embodiment of the present invention, the initial query count and the query response indicator can be selectively used. In addition, information indicating the presence or absence of an MS initial request can be indicated on the basis of specific information indicating inclusion or non-inclusion of the two parameters.

SFH of the step S810 does not include MS-requested information in the current superframe, so that the query response indicator is denoted by "OFF" and then transmitted. In addition, the initial query count indicating an offset extended to a superframe at which MS requested information is to be transmitted is set to 1 and then transmitted.

The femto BS can receive the information query response message including requested information of the step S808 from the information server in step S811.

During the next SFH transmission period, a query response requested by the MS may be contained in the SFH and the resultant SFH can be transmitted. Accordingly, the NIAC field contained in the SFH is set to 'ON', and the query response indicator is set to 'ON'. In the SFH, the initial query count may be set to '0', and the SFH may further include a frame or subframe offset value (yyy) in step S812. In the frame or subframe, MS requested information can be transmitted.

The MS can receive an information response message including specific information requested by the MS in the frame or subframe indicated by the SFH. In this case, the information response message may include an initial query content field, an initial query field, a status field, and a query ID in step S813.

The MAC layer of the MS can transmit information received from the femto BS to the NCMS in step S814.

Optionally, the femto BS can transmit the SFH including MS requested information several times. In this case, the NIAC field contained in the repeatedly transmitted SFH is set to 'ON', and the query response indicator is set to 'ON'. In the SFH, the initial query count is set to 'ON', and the SFH may further include a frame or subframe offset value (yyy) in step S815. In the frame or subframe, MS requested information can be transmitted.

If the femto BS can repeatedly transmit MS requested information, this means that the corresponding message serving as a query ID is repeatedly transmitted in step S816.

If such repeated transmission is completed, the femto BS transmits the SFH to the MS in such a manner that the end of repeated transmission can be indicated in step S817. Here, the SFH includes an initial query count 'ON' and a query response indicator 'OFF'.

The initial network access procedure shown in FIG. 8 can also be applied to the embodiments of the present invention. Of course, the procedure of FIG. 8 can also be applied to the case in which the network entity initially accessed by the MS is the macro BS but not the femto BS.

Figure 9:
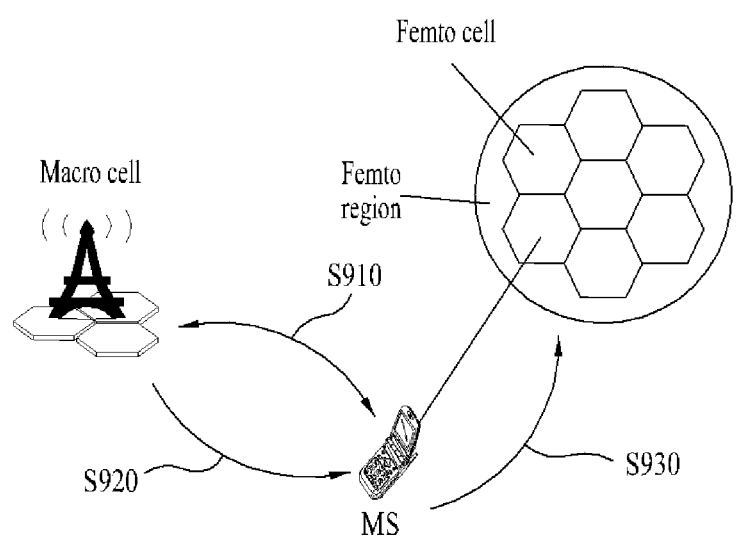
FIG. 9 is a conceptual diagram illustrating a method for allowing an MS to perform handover from a macro BS to a femto BS.

FIG. 9 is a conceptual diagram illustrating a method for allowing an MS to perform handover from a macro BS to a femto BS.

The most universal method from among various methods for enabling the MS to access the femtocell network is as follows. That is, under the condition that the MS has already been connected to the macro BS, the MS receives a coordination message from the BS so that it can be handed over to a suitable femto BS.

For example, the BS provides the MS with neighbor femto BS information (e.g., femto NB table, FSP, number of neighbor femto BSs, and information regarding their enterprise network) of femto BSs located in the vicinity of the MS, so that the MS can select the most appropriate femto BS.

Referring to FIG. 9, the MS connects to a macro cell (i.e., a macro BS) so that it communicates with the macro BS in step 910.

The macro BS can periodically transmit neighbor femto region (i.e., neighbor femto BS) information to the MS in step S920.

If a handover trigger condition is satisfied, the MS can be handed over to the corresponding femto BS on the basis of neighbor femto BS information received from the macro BS in step S930.

However, as shown in FIG. 9, the MS must attempt to directly access the femto BS in a communication environment in which the MS does not receive neighbor femto BS information from the macro BS. For example, assuming that the MS is powered on and performs initial network entry, if an idle-mode MS performs network re-entry, the MS can more efficiently attempt to directly connect to the femto BS.

In this case, the MS can exemplarily attempt to perform initial network access to the femto BS using two methods. That is, under the condition that the femto BS and the macro BS coexist, a total of three combinations of results obtained when the MS searches for an accessible BS entity.

For example, the MS may search for the macro BS only, the MS may search for the femto BS, or the MS may search for both the macro BS and the femto BS. The number of combinations of the searched BSs can be increased according to types of femto BSs detected by the MS, because the initial network access procedure may be changed according to specific information as to whether the femto BS accepting initial network access is searched for.

Under the condition that only the femto BS is searched for, if the searched femto BSs are determined to be closed femto BSs and initial access to the MS not registered in the corresponding service is not accepted, the MS may not access the network within the corresponding region.

In contrast, if the MS searches for the macro BS only, the MS can perform only network access to the macro BS. Therefore, the embodiments of the present invention provide the network access procedure when the MS can perform network access to the femto BS.

Figure 10:
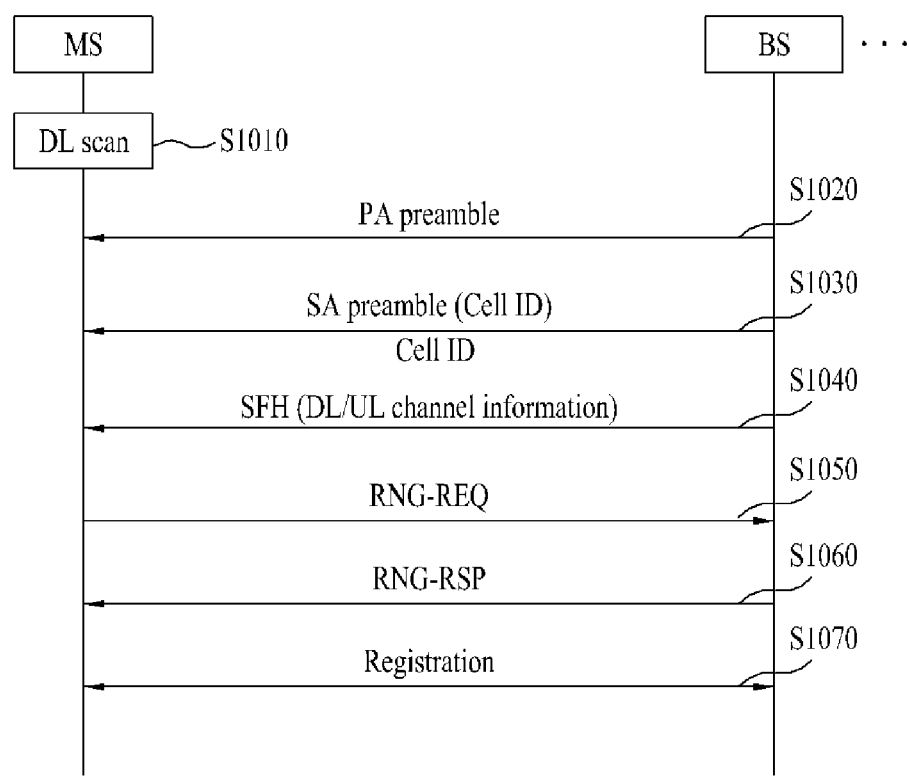
FIG. 10 is a flowchart illustrating a method for performing initial network access when the MS searches for an open femto BS according to one embodiment of the present invention.

FIG. 10 is a flowchart illustrating a method for performing initial network access when the MS searches for an open femto BS according to one embodiment of the present invention.

Referring to FIG. 10, the MS can obtain information of neighbor BSs by searching for a DL channel. In this case, the MS manages the list of searched femto BSs by assigning priority to the open femto BS from among femto BSs in step S1010.

If at least one femto BS from among the searched femto BSs exists, the MS may preferably attempt to perform initial network access to the open femto BS having the highest signal intensity.

The MS can obtain a cell ID of the femto BS through a primary preamble (e.g., PA-preamble) and a secondary preamble (e.g., SA-preamble) transmitted from the open femto BS (open FBS) in steps S1020 and S1030.

The MS can receive a superframe header (SFH) including system information of the femto BS from the femto BS to be accessed by the MS. In this case, system information may include DL channel information and UL channel information. In addition, the SFH may include an FBS_ID, a femto-cell type (or BCC), and an NAIC field indicating whether the MS can access the corresponding femto BS in step S1040.

The MS can transmit a ranging request (RNG-REQ) message including a CDMA ranging code to the femto BS in such a manner that the UE can be synchronized with the UL channel of the femto BS in step S1050.

The femto BS can transmit the RNG-RSP message including not only MS synchronization information but also information regarding a bandwidth allocated to the MS to the MS in step S1060.

The MS and the femto BS perform the registration procedure, and the MS can receive a necessary service from the femto BS in step S1070.

Figure 11:
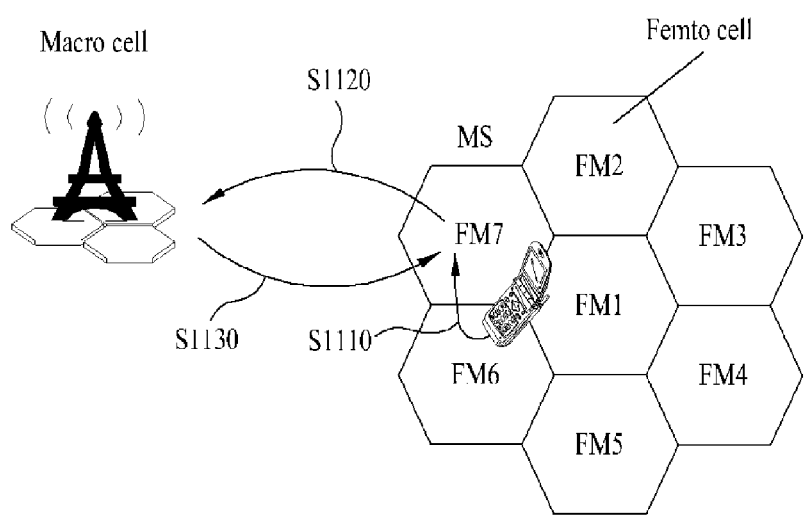
FIG. 11 is a conceptual diagram illustrating one of initial network access methods when the MS does not search for an open femto BS according to another embodiment of the present invention.

FIG. 11 is a conceptual diagram illustrating one of initial network access methods when the MS does not search for an open femto BS according to another embodiment of the present invention.

Referring to FIG. 11, the MS searches for a DL channel of a frequency band corresponding to the macro and femto BSs. In the case where only a closed femto BS from among the MS-searched femto BSs exists and the femto BS capable of providing MS-registered services is not present, the MS needs to obtain system information required for initial network access.

That is, the MS can access an arbitrary femto BS (FM 7) so as to obtain the neighbor femto BS information from the macro BS in step S1110.

FM 7 may request information (e.g., neighbor femto BS information) of the neighbor femto BSs from the macro BS in step S1120.

The macro BS can transmit information of the neighbor femto BSs to the FM 7 in step S1130.

FM 7 can inform the MS of neighbor femto BS information having received from the BS. Therefore, the MS searches for an accessible femto BS on the basis of neighbor femto BS information, so that the initial network access procedure can be carried out.

Figure 12:
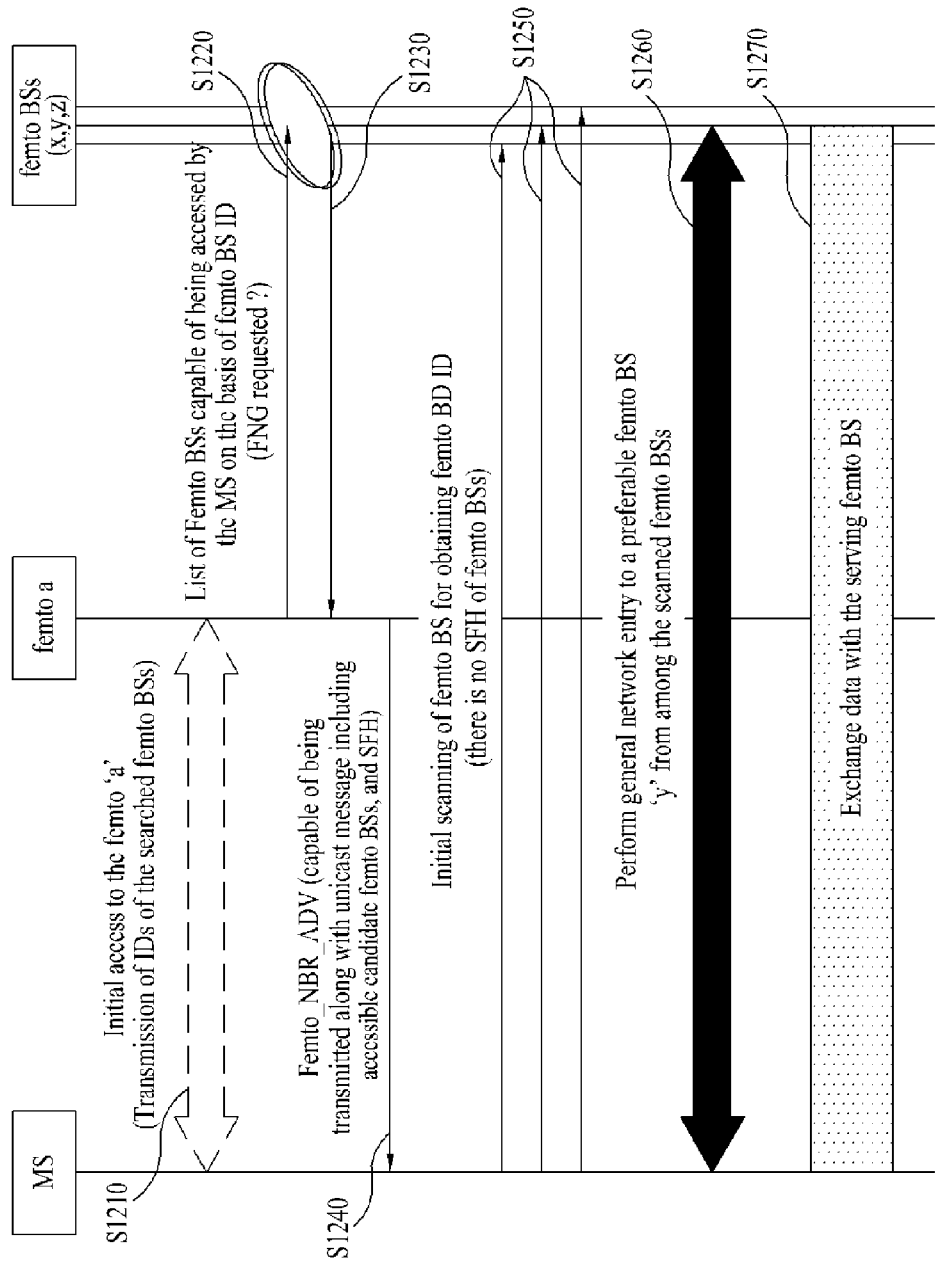
FIG. 12 is a flowchart illustrating another one of initial network access methods when the MS does not search for an open femto BS according to another embodiment of the present invention.

FIG. 12 is a flowchart illustrating another one of initial network access methods when the MS does not search for an open femto BS according to another embodiment of the present invention.

Although the MS searches for the femto BS capable of being initially accessed when searching for neighbor femto BSs, if the MS does not search for a desired femto BS to be used for a handover or a network access, the following network access method can be used, and a detailed description thereof will hereinafter be described with reference to FIG. 12.

The MS searches for DL channels in frequency bands of the macro BS and the femto BS. If the open femto BS from among the femto BSs is not detected, the MS can manage the list of searched BSs by assigning priority to a femto BS capable of accessing initial network information. If the femto BS capable of being accessed by the MS is not present, the MS cannot access the network within the corresponding region.

The MS can obtain a cell ID through a primary preamble (PA-preamble) and SA-preambles transmitted from the femto BSs. In this case, the MS selects the femto BS which has the best signal intensity and at the same time can access the network. Referring to FIG. 12, it is assumed that the femto BS having initial information capable of being accessed by the MS is a femto BS 'a' (hereinafter referred to as 'femto a'). Therefore, the MS performs initial access to the femto 'a', and femto BS IDs of femto BSs to be accessed by the MS are transmitted to the femto 'a' in step S1210.

In step S1210, the MS receives an SFH including DL/UL channel information and an FBS ID from the femto 'a', and the MS can also perform the initial ranging procedure for synchronization with the femto 'a'. In this case, as can be seen from FIG. 8, the SFH may further include an NIAC field and a BCC field.

The femto 'a' connected to the MS can determine whether the MS can access the femto BSs x, y and z on the basis of femto BS IDs received from the MS. In addition, the femto 'a' can obtain information of the femto BSs capable of being accessed by the MS from the femto network gateway (FNG) instead of the femto BSs. As a result, the femto 'a' can construct the list of neighbor femto BSs capable of providing a normal service to the MS in steps S1220 and S1230.

The femto 'a' can transmit a Femto_NBR-ADV message including neighbor femto BS information (e.g., femto BS list information) to the MS. In this case, the Femto_NBR-ADV message serving as a unicast message may include information regarding the femto BS candidates capable of being accessed by the MS. That is, the femto_NBR-ADV message is not periodically transmitted, and is transmitted only upon receiving a request or query message from the MS in step S1240.

The MS having obtained the neighbor FBS information from the femto 'a' can scan preambles of the neighbor FBSs (Femto x, y, z) on the basis of the list of accessible femto BSs in step S1250.

If the femto BS capable of being accessed by the MS is not present in the neighbor FBS information received in step S1250, the NS can access the network within the corresponding region.

The MS can select a specific femto BS 'y' (hereinafter referred to as a femto 'y') from among the femto BSs scanned in step S1250 as a femto BS for initial network access. Therefore, the MS can perform a normal network entry procedure with the femto 'y' in step S1260.

The MS can transmit/receive data to/from the connected serving femto 'y' in step S1270.

The MS and the femto BS shown in FIG. 12 can perform various steps shown in FIG. 8. That is, the MS can perform a variety of initial network access procedures described in FIG. 8 so that it can access the femto BS 'a'.

Initial Network Access Method Through the Macro BS

When the MS scans DL channels of BSs in the overlay network structure (See FIG. 1) so as to perform initial access to the network, the MS can search for at least one macro BS and femto BS.

In this case, if the open femto BS exists in the searched femto BSs, the MS can perform initial access to the network using the scheme of FIG. 8 and/or FIG. 10. If only the closed femto BS other than the open femto BS exists in the searched femto BSs, the MS can perform initial access to the network using the scheme of FIG. 11 or FIG. 12.

However, if the BS capable of performing initial network access is not present in the searched closed femto BSs, the MS can connect to the macro BS but not the femto BS.

Figure 13:
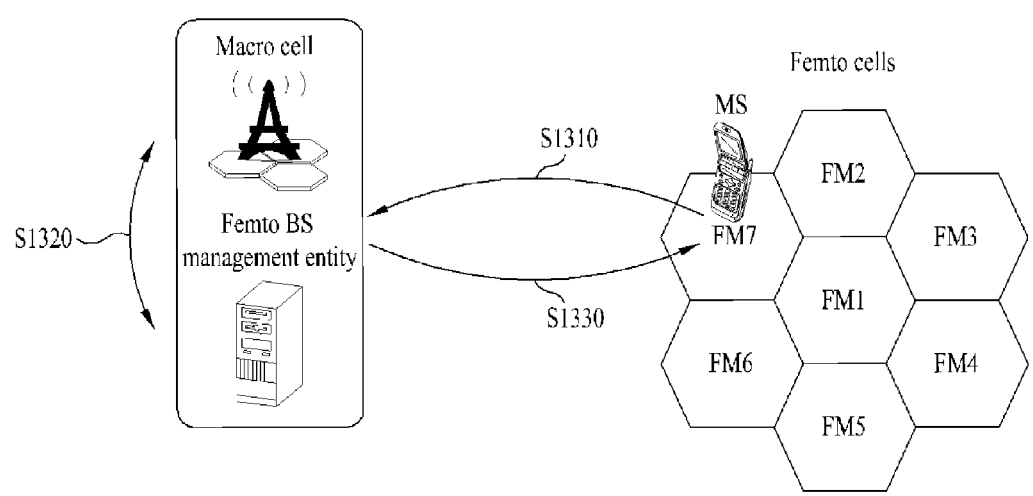
FIG. 13 is a conceptual diagram illustrating one of methods for accessing the network using the macro BS according to still another embodiment of the present invention.

FIG. 13 is a conceptual diagram illustrating one of methods for accessing the network using the macro BS according to still another embodiment of the present invention.

Referring to FIG. 13, the MS can detect DL channels by scanning a frequency band corresponding to the macro BS and the femto BS. If the MS searches for only the macro BS or the closed femto BS, it can perform initial network access to the macro BS. In this case, information regarding the femto BSs detected by the MS can be transmitted to the macro BS in step S1310.

The macro BS can obtain neighbor femto BS information from the femto BS management entity (e.g., FNG) managing the femto BS. In this case, the neighbor femto BS information may include the list of neighbor femto BSs accessible by the MS in step S1320.

In other words, the macro BS includes not only the list of neighbor femto BSs obtained from the femto BS management entity, but also femto BS information obtained from the MS in information received from the MS, so that it creates coordinated information of neighbor femto BS accessible by the MS. As a result, the MS can transmit the coordinated femto BS information to the MS in step S1330.

Accordingly, the MS can perform network access to the neighbor femto BS on the basis of neighbor femto BS information received from the macro BS. That is, the MS can be handed over from the macro BS to the femto BS.

Figure 14:
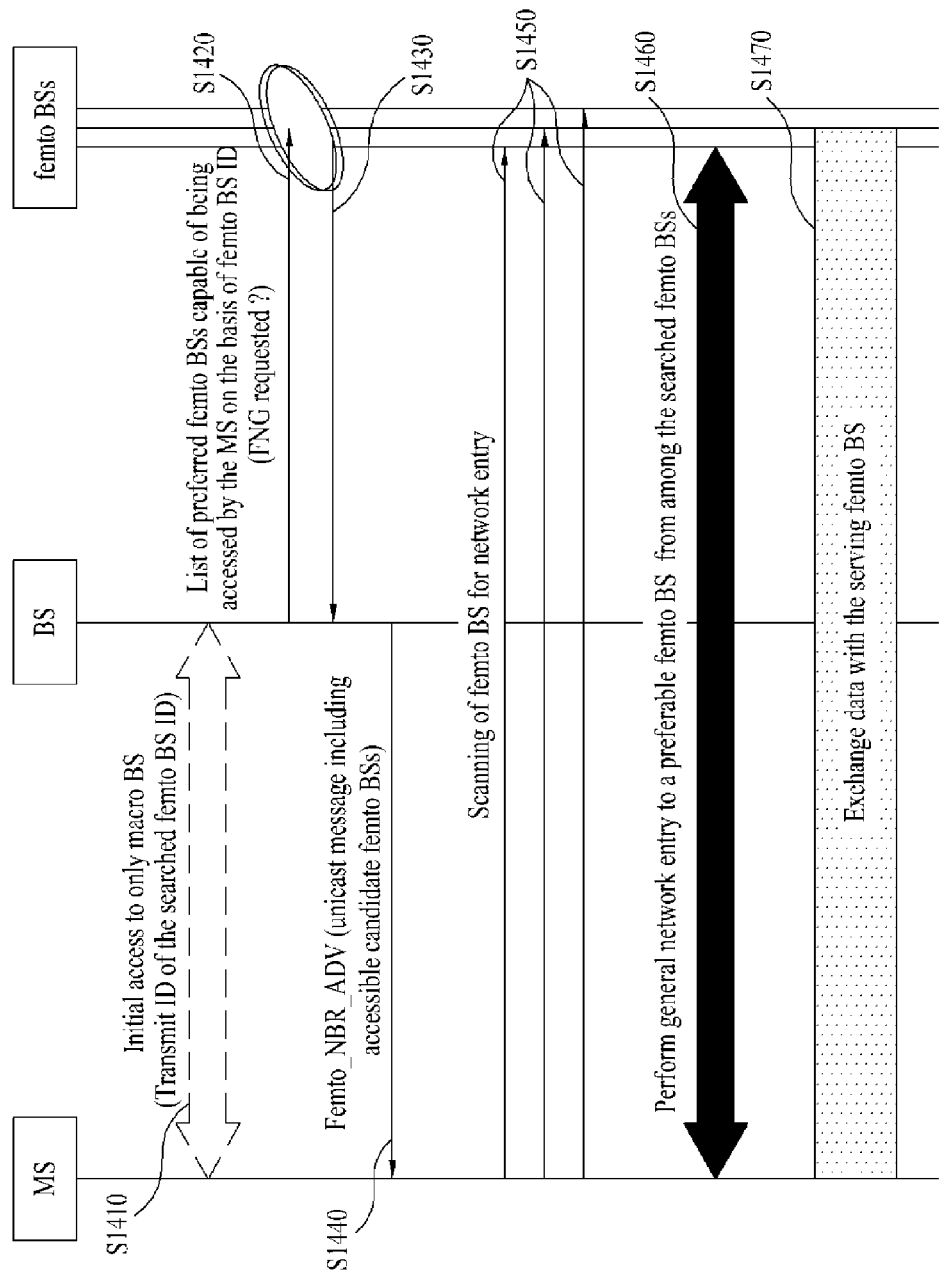
FIG. 14 is a conceptual diagram illustrating one of methods for accessing the network using the macro BS according to still another embodiment of the present invention.

FIG. 14 is a conceptual diagram illustrating one of methods for accessing the network using the macro BS according to still another embodiment of the present invention.

The MS searches BSs by scanning DL channels of the frequency bands of the macro and femto BSs. In this case, it is assumed that the open femto BS from among the searched femto BSs does not exist. In addition, if the accessible femto BS is not present in closed femto BSs from among the searched femto BSs, the MS can perform initial network access to the macro BS. In this case, the MS can transmit information regarding the searched femto BSs to the macro BS in step S1410.

The macro BS directly may query neighbor femto BSs for information regarding neighbor femto BSs, or may obtain neighbor femto BS information from the femto BS management entity (e.g., FNG) as shown in FIG. 13. As a result, the macro BS can construct the list of neighbor femto BSs capable of providing a normal service to the MS in steps S1420 and S1430.

The macro BS may construct the list of neighbor femto BSs capable of providing a normal service to the MS, so that it transmits the list of neighbor femto BSs to the MS. That is, the macro BS can transmit a Femto_NBR_ADV message including neighbor femto BS information (e.g., femto BS list information) to the MS. In this case, the Femto_NBR-ADV message serving as a unicast message may include information regarding femto BS candidates accessible by the MS in step S1440.

The MS having acquired neighbor femto BS information from the macro BS can scan preambles of neighbor femto BSs (femto x, y, z) on the basis of accessible femto BS list information in step S1450.

If the femto BS capable of being accessed by the MS is not present in neighbor femto BS information in step S1450, the MS can connect to the network within the corresponding region.

The femto BS 'y' (hereinafter referred to as a femto 'y') from among femto BSs scanned in step S1450 can be selected as a femto BS for initial network access. Therefore, the MS can perform normal network entry to the femto 'y' in step S1460.

The MS can exchange data with the connected serving femto 'y' in step S1470.

If the MS performs initial network access to the femto BS as shown in FIG. 14, the MS can connect to the femto BS 'y' using the initial network access method of FIG. 8 or FIG. 10.

Figure 15:
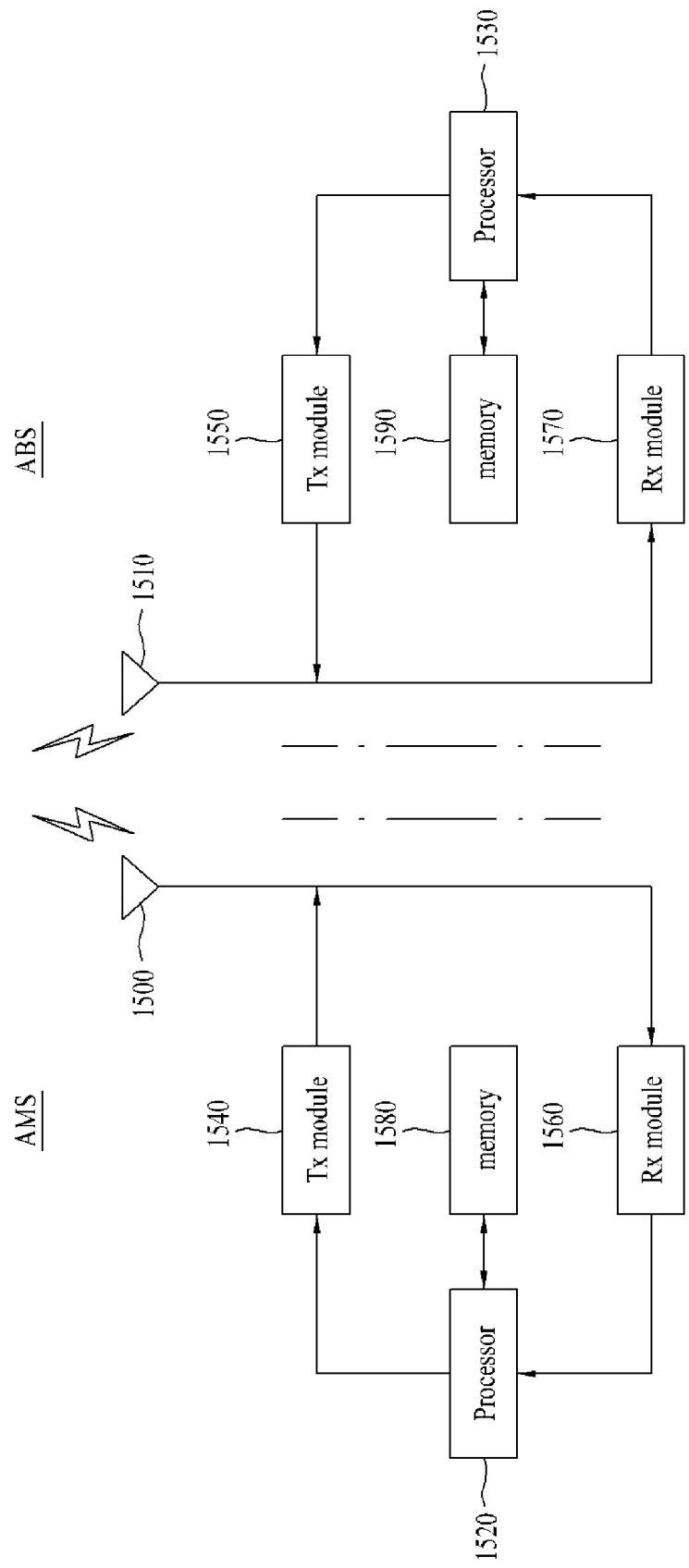
FIG. 15 is a block diagram illustrating the MS and the BS shown in FIGS. 3 to 14 according to the embodiments of the present invention.

FIG. 15 is a block diagram illustrating detailed constituent components of an advanced MS (AMS) and an advanced BS (ABS) that can be implemented in the above-mentioned embodiments of FIGS. 3 to 14.

Referring to FIG. 15, each of the AMS and the ABS may include an antenna 1500 or 1510 for transmitting and receiving information, data, signals and/or messages, a Transmission (Tx) module 1540 or 1550 for transmitting messages by controlling the antenna 1500 or 1510, a Reception (Rx) module 1560 or 1570 for receiving messages by controlling the antenna 1500 or 1510, a memory 1580 or 1590 for storing information related to advanced base station (ABS) communication, and a processor 1520 or 1530 for controlling the memory 1580 or 1590.

In this case, the ABS may be a femto BS (FBS) or a macro BS (MBS). Although the femto BS has a smaller coverage than the macro BS (See FIGS. 1, 2, and 7), most functions provided from the macro BS can be carried out. Therefore, constituent components of the BS shown in FIG. 15 can also be applied to the femto BS.

The antennas 1500 and 1510 include Tx antennas for transmitting signals generated from Tx modules 1540 and 1550 and Rx antennas for receiving radio frequency (RF) signals and providing the received RF signals to the Rx modules 1560 and 1570. If Multiple Input Multiple Output (MIMO) is supported, two or more antennas may be provided.

The processors 1520 and 1530 generally provide overall control to the AMS and the ABS, respectively. Especially, the processors 1520 and 1530 may perform a control function for implementing the above-described exemplary embodiments of the present invention, a variable MAC frame control function based on service characteristics and a propagation environment, a handover function, an authentication and encryption function, etc.

The processor 1520 of the AMS and the processor 1530 of the ABS may include a HARQ module and a timer for the HARQ operation, respectively. That is, the AMS and the ABS can perform methods of FIGS. 3 to 14 using a processor and the HARQ module and timer contained in the processor. In this case, the timer may be located inside or outside the processor.

The Tx modules 1540 and 1550 may encode and/or modulate transmission data scheduled by the processors 1520 and 1530 in a predetermined coding and modulation scheme and provide the modulated data to the antennas 1500 and 1510.

The Rx modules 1560 and 1570 may recover original data by demodulating and decoding data received through the antennas 1500 and 1510 and provide the recovered data to the processors 1520 and 1530.

The memories 1580 and 1590 may store programs for processing and control of the processors 1520 and 1530 and temporarily store input/output data (on the side of the AMS, an uplink grant received from the ABS, system information, a station identifier (STID), a flow identifier (FID), an action time, and the like).

Each of the memories 1580 and 1590 may include at least one type of storage media such as a flash memory, a hard disk, a multimedia card micro, a card-type memory (e.g. a Secure Digital (SD) or extreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

Detailed functions of the AMS and the ABS will hereinafter be described.

The AMS and the ABS can perform the operations of FIGS. 3 to 14 using the antennas (1500, 1510), the processors (1520, 1530), the Tx modules (1540, 1550), and the memories (1580, 1590).

For example, the AMS can perform initial network operations with the macro BS and/or the femto BS. The AMS can connect to the femto BS using the initial network access method of FIG. 8. In this case, the AMS processor may perform the corresponding operation by controlling the MAC layer and the PHY layer. In addition, NCMS may be contained in an arbitrary upper module in the AMS processor, or may be used as an upper controller at an external position spaced apart from the MS.

The AMS processor can search for the macro BS and/or the femto BSs by scanning DL channels. The UE can obtain information required for network access from the searched BSs.

The AMS Rx module transmits the received preambles (PA-preamble, SA-preamble), messages, and SFHs to the processor under the control of the antenna. In this case, the Rx module may decode the above-mentioned information and transmit the decoded result to the processor. The processor can perform methods of FIGS. 3 to 14 on the basis of each preamble, messages, and SFH information.

In addition, the processor of the femto BS can decode data received from the AMS so that it can perform methods of FIGS. 3 to 14. Individual operation methods may refer to the corresponding drawings.

Meanwhile, the AMS in the present invention may be any of a Personal Digital Assistant (PDA), a cellular phone, a Personal Communication Service (PCS) phone, a Global system for Mobile (GSM) phone, a Wideband CDMA (WCDMA) phone, a Mobile Broadband System (MBS) phone, a hand-held PC, a notebook PC, a smart phone, a Multi Mode-Multi Band (MM-MB) terminal, etc.

The embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiment of the present invention may be achieved by a module, a procedure, a function, etc. performing the above-described functions or operations. For example, software code may be stored in the memory units 1280 and 1290 and executed by the processors 1220 and 1230. The memory units are located at the interior or exterior of the processor and may transmit data to and receive data from the processor via various known means.

The embodiments of the present invention may be carried out in other specific ways without departing from the spirit and essential characteristics of the present invention. The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to various wireless access systems, for example, a 3GPP system, a 3GPP2, and/or an IEEE 802.xx system. The embodiments of the present invention may be applied to all technical fields applying the various wireless access systems, as well as the various wireless access systems.

The invention claimed is:

1. A method for performing initial access to a network in a femtocell environment, the method comprising:
   detecting a femto base station (BS) by scanning a downlink (DL) channel;
   receiving a preamble from the femto BS, wherein the preamble includes not only a femto BS indicator indicating whether a corresponding BS is a femto BS but also a cell identifier (ID);
   receiving a superframe header (SFH) including a network initial access capability (NIAC) field and an offset field from the femto BS, wherein the NIAC field indicates whether it is possible to access the network and the offset field indicates a specific time at which network access information required for performing initial access to the network is transmitted; and
   obtaining the network access information at the specific time indicated by the offset,
   wherein the superframe header(SFH) further includes a femto BS ID and a femto type field indicating whether the femto BS is an open femto BS or a closed femto BS.

2. The method according to claim 1, wherein the preamble includes a primary preamble (PA-preamble) and a secondary preamble (SA-preamble).

3. The method according to claim 2, wherein the femto BS indicator is contained in the primary preamble (PA-preamble) and the cell ID is contained in the secondary preamble (SA-preamble).

4. The method according to claim 1, wherein:
   if only a macro BS other than the femto BS is detected in the detecting of the femto BS, a mobile station (MS) attempts to perform initial network access to the macro BS and obtains the network access information of the femto BS.

5. The method according to claim 1, wherein the femto BS is an open femto BS.

6. A method for performing initial access to a network in a femtocell environment, the method comprising:
   transmitting a preamble to a mobile station (MS), wherein the preamble includes not only a femto base station (BS) indicator indicating whether a corresponding BS is a femto BS but also a cell identifier (ID);
   transmitting a superframe header (SFH) including a network initial access capability (NIAC) field and an offset field to the mobile station (MS), wherein the NIAC field indicates whether it is possible to access the network and the offset field indicates a specific time at which network access information required for performing initial access to the network is transmitted; and
   transmitting the network access information to the mobile station (MS) at the specific time indicated by the offset,
   wherein the superframe header (SFH) further includes a femto BS ID and a femto type field indicating whether the femto BS is an open femto BS or a closed femto BS.

7. The method according to claim 6, wherein the preamble includes a primary preamble (PA-preamble) and a secondary preamble (SA-preamble).

8. The method according to claim 7, wherein the femto BS indicator is contained in the primary preamble (PA-preamble) and the cell ID is contained in the secondary preamble (SA-preamble).

9. A mobile station (MS) for performing initial access to a network in a femtocell environment, the mobile station (MS) comprising:
- a transmission (Tx) module for transmitting radio data;
- a reception (Rx) module for receiving radio data; and
- a processor for controlling initial access to the network by controlling the transmission (Tx) module and the reception (Rx) module,
- wherein the processor detects a femto base station (BS) by scanning a downlink (DL) channel, receives a preamble from the femto BS,
- wherein the preamble includes not only a femto BS indicator indicating whether a corresponding BS is a femto BS but also a cell identifier (ID), receives a superframe header (SFH) including a network initial access capability (NIAC) field and an offset field from the femto BS,
- wherein the NIAC field indicates whether it is possible to access the network and the offset field indicates a specific time at which network access information required for performing initial access to the network is transmitted, and obtains the network access information at the specific time indicated by the offset, and
- wherein the superframe header (SFH) further includes a femto BS ID and a femto type field indicating whether the femto BS is an open femto BS or a closed femto BS.

10. The mobile station (MS) according to claim 9, wherein the preamble includes a primary preamble (PA-preamble) and a secondary preamble (SA-preamble).

11. The mobile station (MS) according to claim 10, wherein the femto BS indicator is contained in the primary preamble (PA-preamble) and the cell ID is contained in the secondary preamble (SA-preamble).

12. The mobile station (MS) according to claim 9, wherein:
- if only a macro BS other than the femto BS is detected in the detecting of the femto BS, a mobile station (MS) attempts to perform initial network access to the macro BS and obtains the network access information of the femto BS.

13. The mobile station (MS) according to claim 9, wherein the femto BS is an open femto BS.

* * * * *